United States Patent
Tajima

(10) Patent No.: US 9,294,648 B2
(45) Date of Patent: Mar. 22, 2016

(54) IMAGE READING DEVICE

(71) Applicants: KABUSHIKI KAISHA TOSHIBA, Tokyo (JP); TOSHIBA TEC KABUSHIKI KAISHA, Tokyo (JP)

(72) Inventor: Akinori Tajima, Mishima Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/598,889

(22) Filed: Jan. 16, 2015

(65) Prior Publication Data
US 2015/0207953 A1 Jul. 23, 2015

(30) Foreign Application Priority Data
Jan. 17, 2014 (JP) .................................. 2014-006608

(51) Int. Cl.
*H04N 1/04* (2006.01)
*H04N 1/028* (2006.01)
*H04N 1/10* (2006.01)

(52) U.S. Cl.
CPC ......... *H04N 1/02885* (2013.01); *H04N 1/0281* (2013.01); *H04N 1/02895* (2013.01); *H04N 1/1017* (2013.01); *H04N 2201/0081* (2013.01)

(58) Field of Classification Search
CPC ............... H04N 2201/02462; H04N 1/02865; H04N 1/02815; H04N 2201/03145; H04N 1/1017; H04N 2201/0081; H04N 2201/03112; H04N 2201/03125; H04N 1/0289
USPC ......... 358/475, 474, 488, 497, 504, 482, 496, 358/509
See application file for complete search history.

(56) References Cited

U.S. PATENT DOCUMENTS

| | | | |
|---|---|---|---|
| 2005/0242085 A1* | 11/2005 | Kaji et al. | 219/620 |
| 2012/0300271 A1* | 11/2012 | Ishida | 358/475 |
| 2014/0092444 A1* | 4/2014 | Lee et al. | 358/474 |
| 2014/0293368 A1* | 10/2014 | Kurotsu | 358/474 |
| 2014/0376254 A1* | 12/2014 | Arimoto et al. | 362/583 |
| 2015/0015924 A1* | 1/2015 | Fujiuchi et al. | 358/474 |
| 2015/0062668 A1* | 3/2015 | Iwamatsu et al. | 358/475 |
| 2015/0062670 A1* | 3/2015 | Yoshida et al. | 358/482 |
| 2015/0156372 A1* | 6/2015 | Aramaki | 358/475 |
| 2015/0207954 A1* | 7/2015 | Sugiyama et al. | 358/501 |
| 2015/0256703 A1* | 9/2015 | Shimoda | 358/474 |
| 2015/0293368 A1* | 10/2015 | Yamamoto | 358/509 |

FOREIGN PATENT DOCUMENTS

JP 2013-090197 A 5/2013

* cited by examiner

*Primary Examiner* — Negussie Worku
(74) *Attorney, Agent, or Firm* — Patterson & Sheridan, LLP

(57) ABSTRACT

An image reading device includes a document table having a document read area, and an illumination unit that includes a light source configured to illuminate the document read area and a light-guiding body configured to allow light from the light source to be incident on both end portions extending in a main-scanning direction and configured to scatter or reflect the light to be emitted toward the document read area. The device includes an arc-shaped stepped portion that is formed at both end portions of the light-guiding body, a carriage that supports the illumination unit to be movable in a sub-scanning direction, a hold-down member that holds down the both end portions of the light-guiding body towards the carriage and is attached to the arc-shaped stepped portion to regulate movement of the light-guiding body in the main-scanning direction, and a photoelectric conversion unit.

17 Claims, 7 Drawing Sheets

IMAGE READING DEVICE

CROSS-REFERENCE TO RELATED APPLICATION

This application is based upon and claims the benefit of priority from Japanese Patent Application No. 2014-006608, filed Jan. 17, 2014; the entire contents of which are incorporated herein by reference.

FIELD

Embodiments described herein relate generally to an image reading device that includes an illumination unit having a light-guiding body and reads an image of a document by illuminating the document with light from the illumination unit.

BACKGROUND

In the related art, an image reading device used in digital copy machines and the like illuminates a document with linear light from a light source along a main-scanning direction, condenses reflective light from the document using lenses and the like, and allows the reflective light to be incident on an image sensor to read an image on the document.

As the light source for illuminating a document in the image reading device, for example, xenon lamps or light-emitting diode (LED) light sources are used. Methods for using LED light sources include a method of disposing a plurality of LEDs in a main-scanning direction to illuminate a document and a method of guiding LED light to a document surface using a light-guiding body to direct the light toward a document.

When a light-guiding body is used, LEDs are disposed at both ends of the light-guiding body, and light from the LEDs is scattered or reflected at the light-guiding body toward a document read area. Thus, the document read area is illuminated with the light. In addition, both ends of the light-guiding body are held in a holding unit by flat springs, and planar steps are disposed in both end portions of the light-guiding body to regulate movement of the light-guiding body in a main-scanning direction. The flat springs hold down the upper surface of the light-guiding body and are in contact with the planar steps of the light-guiding body on the side surface thereof to position the light-guiding body.

However, the planar steps in both end portions of the light-guiding body cause a radical change in the illuminance distribution in the vicinity of both ends of the light-guiding body, which results in substantial ripples in the illuminance distribution. When the illuminance distribution of the light-guiding body is not smooth, a shading process does not function correctly, and stripes occur in an image read from a document in a sub-scanning direction. Thus, reading performance may deteriorate.

DETAILED DESCRIPTION

Embodiments provide an image reading device that includes a light-guiding body in which substantial ripples do not occur in illuminance distribution and maintains favorable reading performance of a document.

In general, according to one embodiment, an image reading device includes: a document table having a document read area; and an illumination unit that includes a light source configured to illuminate the document read area, and a light-guiding body configured to allow light from the light source to be incident on both end portions extending in a main-scanning direction and configured to scatter or reflect the light to be emitted toward the document read area. The device includes an arc-shaped stepped portion that is formed at both end portions of the light-guiding body; a carriage that supports the illumination unit to be movable in a sub-scanning direction; a hold-down member that holds down the both end portions of the light-guiding body towards the carriage and is attached to the arc-shaped stepped portion to regulate movement of the light-guiding body in the main-scanning direction; and a photoelectric conversion unit configured to receive reflective light from a document in the document read area illuminated by the illumination unit, and photoelectrically convert the light to output an electric signal.

Hereinafter, exemplary embodiments will be described with reference to the accompanying drawings. Like elements in each drawing will be given the same reference sign.

First Embodiment

Figure 1:
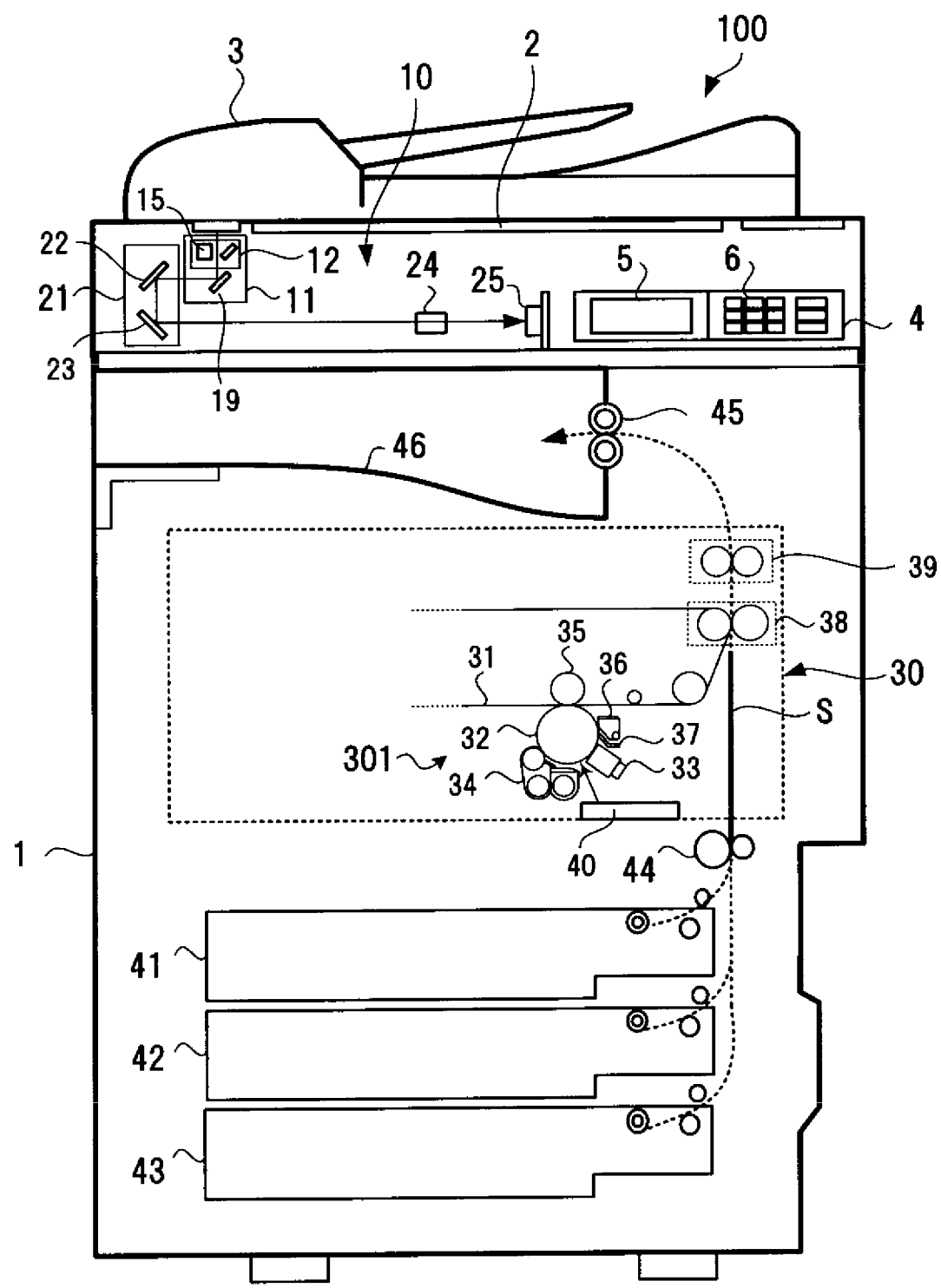
FIG. 1 is a configuration diagram illustrating an image forming apparatus that includes an image reading device according to an exemplary embodiment.

FIG. 1 is a configuration diagram illustrating an image forming apparatus that includes an image reading device according to an exemplary embodiment. An image forming apparatus 100 is a multi-function peripheral (MFP), such as a multi-function machine, a printer, a copy machine, or the like. An MFP will be described as an example of the image forming apparatus 100 hereafter.

A transparent document table 2 is in an upper portion of a main body 1 of the MFP 100. An automatic document feeder (ADF) 3 is disposed to be opened and closed over the document table 2. In addition, an operation panel 4 is disposed in the upper portion of the main body 1. The operation panel 4 includes a touch panel-type display unit 5 and various operation keys 6.

A scanner unit 10 that is the image reading device is disposed under the document table 2 of the MFP 100. The scanner unit 10 (image reading device) scans a document transported by the ADF 3 or a document surface placed in the document table 2. The scanner unit 10 includes a first carriage 11 and a second carriage 21.

The first carriage 11 includes an illumination unit 12 that illuminates the document surface and irradiates a document with light from the illumination unit 12 (the illumination unit is described in detail below). The illumination unit 12 extends in a main-scanning direction (depth direction of a paper). Light reflected from the document is reflected at a mirror 19.

The second carriage 21 includes mirrors 22 and 23 that reflect light reflected at the mirror 19 and guides light reflected at the mirror 23 to a charge-coupled device (CCD) through a lens 24. The CCD 25 is an image sensor. Reflective light from the document is photoelectrically converted by the CCD 25, and an electric signal is output from the CCD 25. The CCD 25 comprises a photoelectric conversion unit. The electric signal output from the CCD 25 is subjected to an image process, and image data is generated.

When reading a document transported by the ADF 3, the scanner unit 10 fixes the first carriage 11 at a position illustrated in FIG. 1 (below the ADF 3). The second carriage 21 is positioned close to the first carriage 11. When reading a document placed on the document table 2, the scanner unit 10 moves the first carriage 11 and the second carriage 21 parallel to the document table 2 in a sub-scanning direction and reads the document placed on the document table 2.

The main-scanning direction is a direction orthogonal to the direction of movement of the first carriage 11 and corresponds to a direction in which the CCD 25 is disposed. The sub-scanning direction is a direction orthogonal to the main-scanning direction.

A printer unit 30 is disposed inside the main body 1 of the MFP 100. The printer unit 30 includes a photoreceptor drum, a laser, and the like and processes image data read in the scanner unit 10 or image data created in a personal computer (PC) and the like to form an image on a recording medium. A sheet S will be described as an example of the recording medium hereafter.

The printer unit 30 includes a plurality of image formation units 301, for example, on the lower side of a loop-shaped transfer belt 31 from the upstream side to the downstream side. The image formation unit 301 scans and exposes the outer surface of the photoreceptor drum 32 with a laser beam from a laser 40 to form an electrostatic latent image on the photoreceptor drum 32. The laser 40 emits laser light based on image data read in the scanner unit 10. An electrifying charger 33, a developing device 34, a primary transfer roller 35, a cleaner 36, a blade 37, and the like are disposed around the photoreceptor drum 32.

The electrifying charger 33 uniformly electrifies the entire outer surface of the photoreceptor drum 32. The developing device 34 includes a mixer that stirs a developer and a development roller to which a development bias is applied and supplies a toner of a two-component developer formed of a toner and a carrier to the photoreceptor drum 32 using the development roller. The cleaner 36 uses the blade 37 to remove a toner that remains on the outer surface of the photoreceptor drum 32.

A toner image on the photoreceptor drum 32 is transferred to the transfer belt 31 by the primary transfer roller 35. The toner image transferred to the transfer belt 31 is further transferred to the sheet S by a secondary transfer roller 38. The toner image transferred to the sheet S is fixed by a fixing device 39. The fixing device 39 includes a fixation roller and a pressurization roller. Passing the sheet S between the fixation roller and the pressurization roller fixes the toner image on the sheet S.

In a case of forming a color image, the printer unit 30 includes the plurality of image formation units 301 with colors of black, magenta, cyan, yellow, and the like. Configurations of the printer unit 30 are not limited to the above example. The printer unit 30 may be configured in various ways.

A plurality of cassettes 41 to 43 that accommodates sheets of various sizes is disposed in a lower portion of the main body 1. The number of cassettes is not limited to three. A transport roller 44 that transports the sheet S drawn out of each of the cassettes 41 to 43 to the printer unit 30 is disposed between the cassettes 41 to 43 and the secondary transfer roller 38. When the image is completely formed after the toner image is fixed on the sheet S by the fixing device 39, the sheet S is discharged to a sheet discharge unit 46 by a sheet discharge roller 45.

Figure 2:
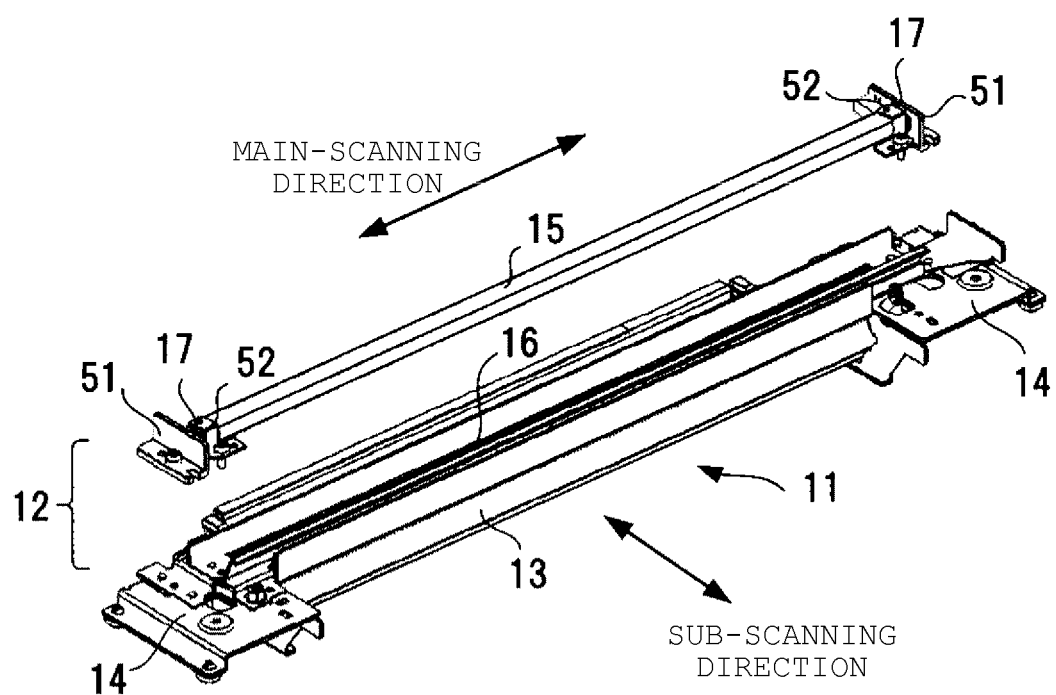
FIG. 2 is a perspective diagram illustrating a carriage that includes an illumination unit in the exemplary embodiment.

FIG. 2 is a perspective diagram illustrating the configuration of the first carriage 11 that includes the illumination unit 12. The first carriage 11 includes a carriage main body 13 that extends in the main-scanning direction and a pair of sliders 14 that are respectively attached to both ends of the carriage main body 13 and are movable in the sub-scanning direction. The sliders 14 are movable on rail members (not illustrated) that are disposed parallel to each other in the sub-scanning direction. The illumination unit 12 includes a pillar-shaped light-guiding body 15 and a reflective member 16. The light-guiding body 15 and the reflective member 16 are attached on the carriage main body 13. The light-guiding body 15 is illustrated as being detached from the carriage main body 13 in FIG. 2.

Light-emitting diodes (LED) 17 as light sources are attached to both ends of the light-guiding body 15 so as to face each other. The LED 17 is supported by a support member 51 and faces an end portion of the light-guiding body 15. The support member 51 is fixed to the slider 14. Both end portions of the light-guiding body 15 are fixed to the slider 14 by a hold-down member 52 that is shaped like a flat spring. Both ends of the light-guiding body 15 are pushed down by the hold-down member 52 (the hold-down member 52 will be described in detail later). Light from the LED 17 is incident on both ends of the light-guiding body 15. The incident light is reflected or scattered by the light-guiding body 15 and is emitted in the direction of the document table 2 and in the direction of the reflective member 16 along the main-scanning direction.

Figure 3:
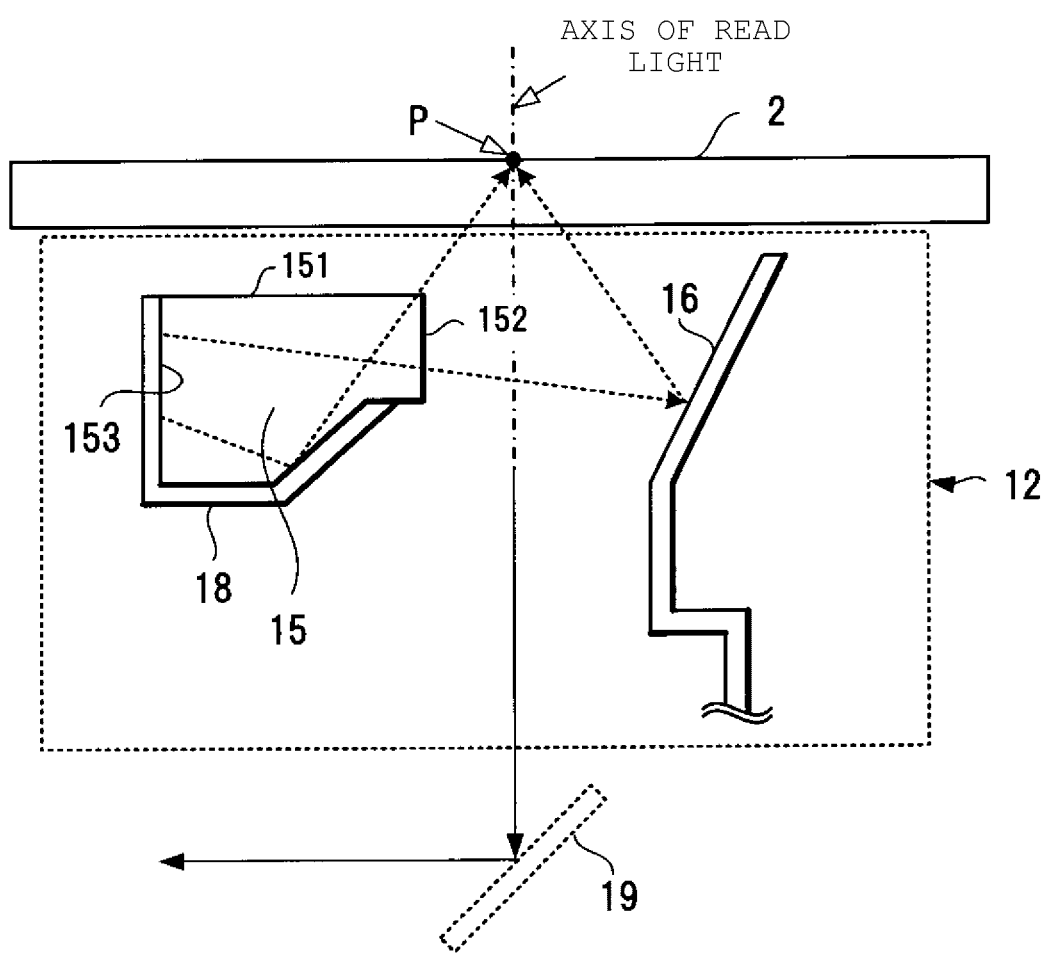
FIG. 3 is a cross-sectional diagram illustrating enlarged main portions of the illumination unit in the exemplary embodiment.

FIG. 3 is a cross-sectional diagram illustrating the enlarged illumination unit 12 and illustrates the cross-sectional structure of the illumination unit 12 orthogonal to the main-scanning direction. As illustrated in FIG. 3, the illumination unit 12 illuminates a document read area P on the document table 2. The light-guiding body 15 and the reflective member 16 are disposed across the axis of read light as a center that passes through the read area P. The illumination unit 12 allows light from the LED 17 to be incident on both ends of the light-guiding body 15, guides the light in the longitudinal direction (main-scanning direction) of the light-guiding body 15, and emits the light in the direction of the document read area P and in the direction of the reflective member 16.

The light-guiding body 15 includes a first surface 151 where light is emitted to the document table 2 side and a second surface 152 where light is emitted to the reflective member 16 side. Other surfaces of the light-guiding body 15 are covered by a case member 18. A third surface of the light-guiding body 15 that faces the second surface 152 is a light scatter surface 153 that scatters or reflects light.

The light-guiding body 15 can include, for example, a prism that is formed of a high light-transmissive resin, such as an acrylic resin and a polycarbonate resin, or a transparent medium, such as an optical glass. The case member 18 is a high light-reflective metal plate and can be an aluminum plate, a stainless plate, or the like. The light scatter surface 153 scatters or reflects light from the LED 17. The light scatter surface 153 has a light-scattering structure (for example, a group of V-shaped minute grooves or a substantially hemispheric rough shape).

The reflective member 16 is disposed under the lower surface of the document table 2 to face the light-guiding body 15 and reflects a light beam emitted from the second surface 152 of the light-guiding body 15 upward to the read area P. A reflective surface of the reflective member 16 is a glossy surface with high light reflection characteristics. Accordingly, light emitted from the first surface 151 of the light-guiding body 15 and light reflected at the reflective member 16 illuminate the read area P as a linear light beam in the main-scanning direction.

As described above, the illumination unit 12 reflects or scatters light from the LED 17 using the light-guiding body 15 and illuminates the read area P on the document table 2 with a light beam emitted from the first surface 151. In addition, the illumination unit 12 reflects a light beam emitted from the second surface 152 using the reflective member 16 to illuminate the read area P. Light reflected from a document on the document table 2 is reflected at the mirror 19 that is disposed on the axis of read light and is further reflected toward the mirror 22 of the second carriage 21.

Figure 4:
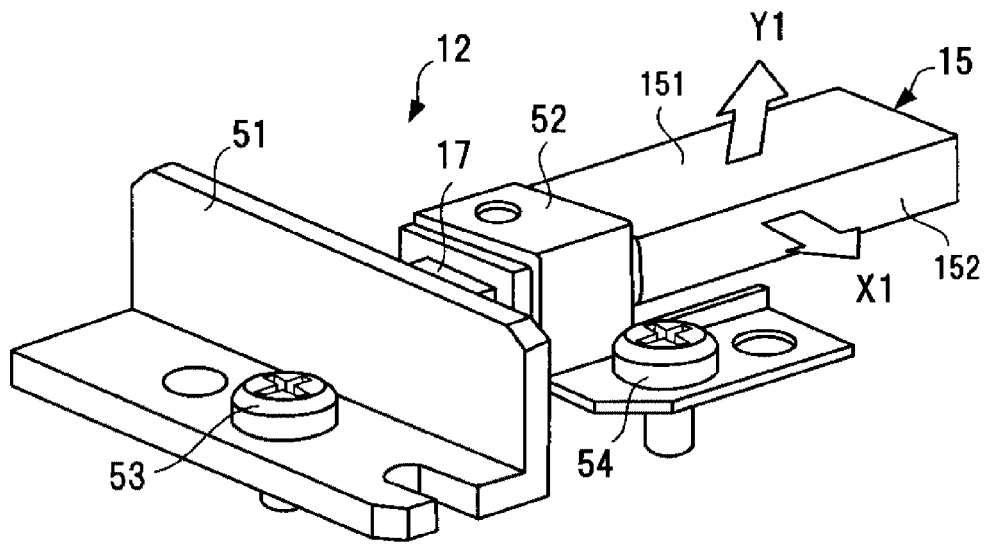
FIG. 4 is an exploded perspective diagram illustrating enlarged portions of the illumination unit.
Figure 5:
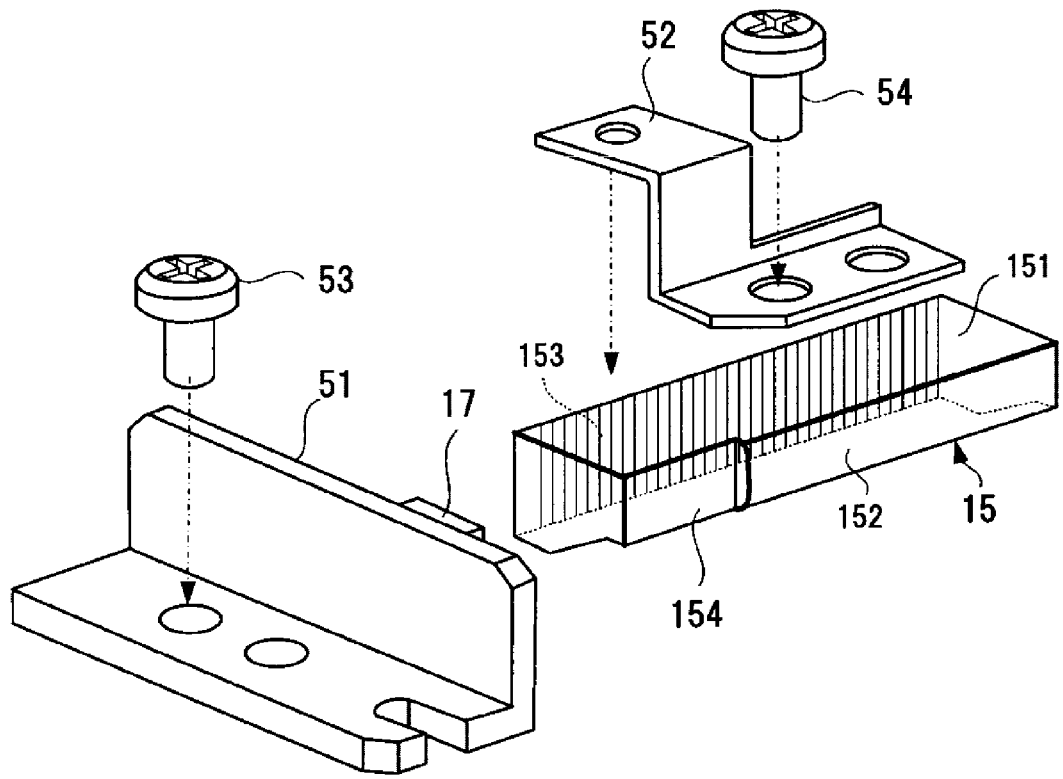
FIG. 5 is a perspective diagram illustrating one example of an assembled state of the illumination unit in FIG. 4.

FIG. 4 is an exploded perspective diagram illustrating enlarged portions of the illumination unit 12. FIG. 5 is a perspective diagram illustrating an assembled state of the illumination unit 12 in FIG. 4.

FIG. 4 illustrates the structure of one end portion of the light-guiding body 15. The LED 17 is attached to a part of the support member 51 that faces the light-guiding body 15. The support member 51 is attached to the slider 14 (FIG. 2) with a screw 53. In addition, one end portion of the light-guiding body 15 is held down by the hold-down member 52. The hold-down member 52 is attached to the slider 14 (FIG. 2) with a screw 54. Light from the LED 17 is incident on one end of the light-guiding body 15 and is reflected or scattered in the light-guiding body 15 to be emitted from the first surface 151 as a light beam Y1 and from the second surface 152 as a light beam X1.

As illustrated in FIG. 5, a planar shoulder or step, referred to as planar stepped portion 154, is formed on a side surface of one end portion of the light-guiding body 15. An upper surface of the hold-down member 52 holds down the light-guiding body 15, and a side surface of the hold-down member 52 abuts on the stepped portion 154 of the light-guiding body 15. Both end portions of the light-guiding body 15 are held down by the hold-down members 52 that have the same structure as illustrated in FIG. 2. Thus, the side surface of the hold-down member 52 abutting on the stepped portion 154 in both end portions of the light-guiding body 15 regulates movement of the light-guiding body 15 in the longitudinal direction (main-scanning direction). The stepped portion 154 is formed in an end portion of the second surface 152.

Figure 6:
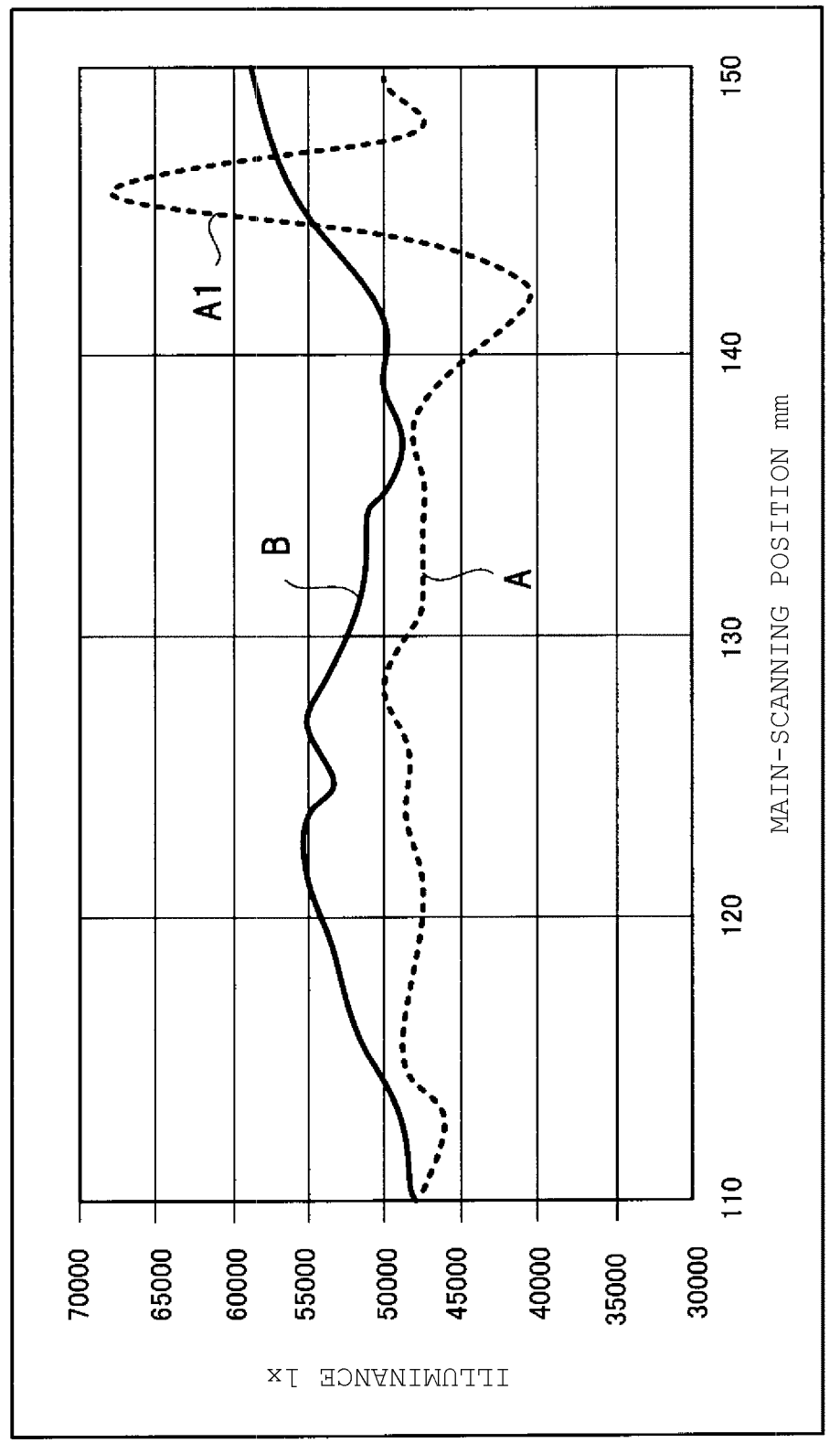
FIG. 6 is a characteristic diagram illustrating illuminance distribution in one end portion of a light-guiding body in the exemplary embodiment.

When the light-guiding body 15 including the planar stepped portion 154 illustrated in FIG. 5 is used, illuminance distribution measured on a document surface has a characteristic as illustrated with a dotted line A in FIG. 6. FIG. 6 is a diagram illustrating illuminance distribution in one end portion of the light-guiding body 15. In FIG. 6, the dotted line A illustrates illuminance distribution in the end portion of the light-guiding body 15 that includes the planar stepped portion 154. Illuminance radically changes in the vicinity of the end portion, and a so-called ripple A1 occurs. For this reason, reading performance of a document deteriorates in the end portion of the light-guiding body 15 in the main-scanning direction.

In embodiments described herein, the stepped portion in the end portion of the light-guiding body 15 is not planar, but arc-shaped.

Figure 7:
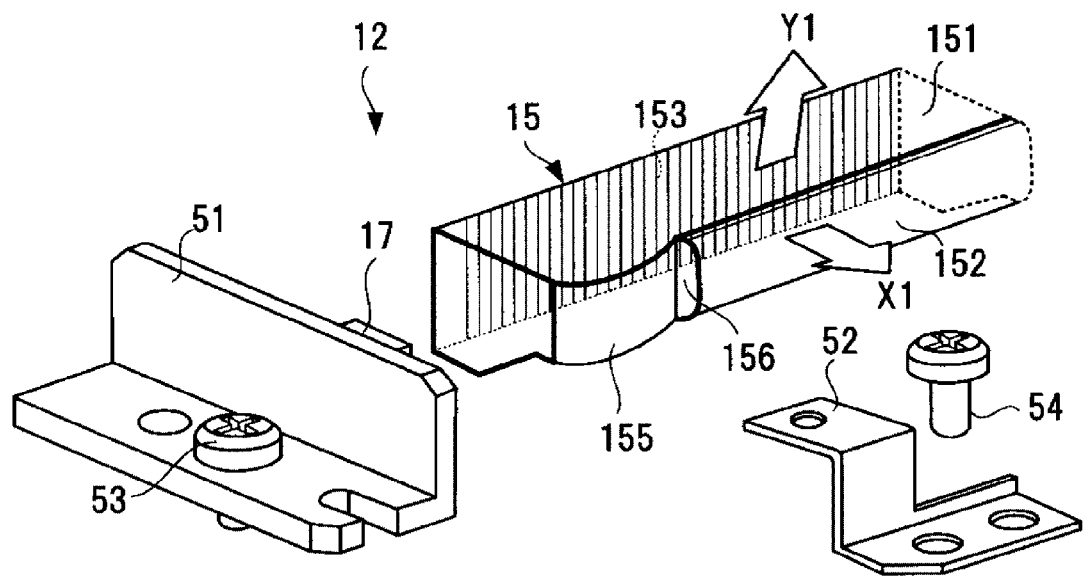
FIG. 7 is an exploded perspective diagram illustrating the configuration of the light-guiding body of the illumination unit in the exemplary embodiment.

FIG. 7 is an exploded perspective diagram illustrating the configuration of main portions of the illumination unit 12 according to the first embodiment. One end portion of the light-guiding body 15 is illustrated as being enlarged. An arc-shaped stepped portion 155 is disposed in an end portion of the second surface 152 of the light-guiding body 15 in the longitudinal direction.

The LED 17 is attached to a part of the support member 51 that faces the light-guiding body 15 in FIG. 7. The support member 51 is attached to the slider 14 (FIG. 2) by the screw 53. One end portion of the light-guiding body 15 is held down by the hold-down member 52. The hold-down member 52 is attached to the slider 14 (FIG. 2) with the screw 54. Light from the LED 17 is incident on one end of the light-guiding body 15 and is reflected or scattered in the light-guiding body 15 to be emitted from the first surface 151 as the light beam Y1 and from the second surface 152 as the light beam X1.

The side surface of the hold-down member 52 abuts on a riser portion 156 of the light-guiding body 15. The riser portion 156 is formed because the arc-shaped stepped portion 155 is positioned slightly lower than the second surface 152 (e.g., the arc-shaped stepped portion 155 is recessed below the second surface 152). Both end portions of the light-guiding body 15 are held down by the hold-down members 52 that have the same structure. Thus, the side surface of the hold-down member 52 abutting the riser portion 156 in both end portions of the light-guiding body 15 regulates movement of the light-guiding body 15 in the longitudinal direction. The arc-shaped stepped portion 155 is formed in an end portion of a surface (second surface) that faces the surface where the light scatter surface 153 is disposed.

Figure 8:
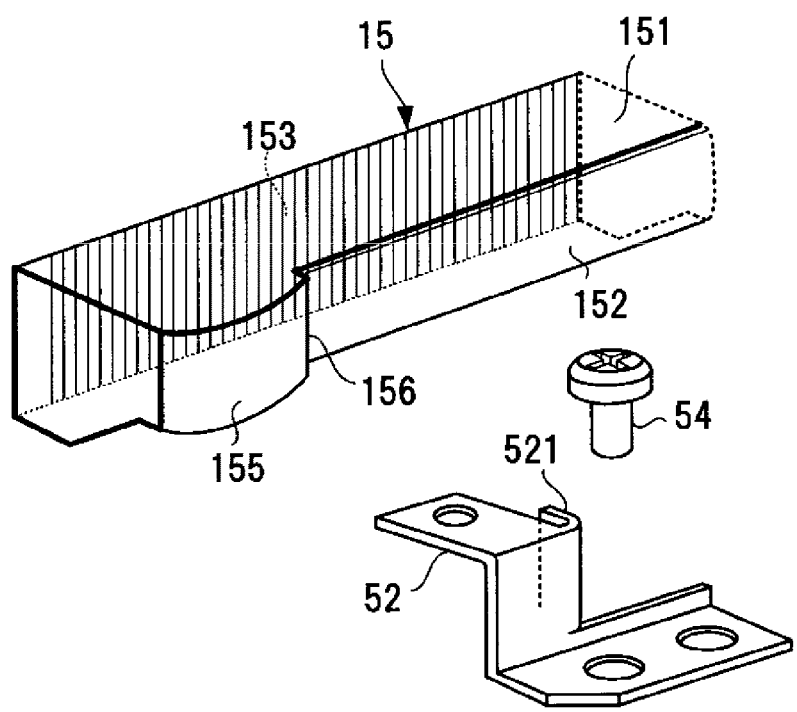
FIG. 8 is a perspective diagram illustrating another configuration of the light-guiding body in the exemplary embodiment.

FIG. 8 is a perspective diagram illustrating another shape of the arc-shaped stepped portion 155. FIG. 8 illustrates an example of the arc-shaped stepped portion 155 that protrudes slightly above the second surface 152. The riser portion 156 is formed on a side surface of the protrusion of the arc-shaped stepped portion 155 in FIG. 8. Accordingly, a folded portion 521 that is in contact with the riser portion 156 is disposed on the side surface of the hold-down member 52. Even with the configuration in FIG. 8, both end portions of the light-guiding body 15 are respectively held down by the hold-down members 52 that have the same structure, and the side surface of the hold-down member 52 and the folded portion 521 respectively abut on the arc-shaped stepped portion 155 and the riser portion 156 in both end portions of the light-guiding body 15. Accordingly, the light-guiding body 15 may be held down on the slider 14 side, and movement of the light-guiding body 15 in the longitudinal direction may be regulated.

Figure 9:
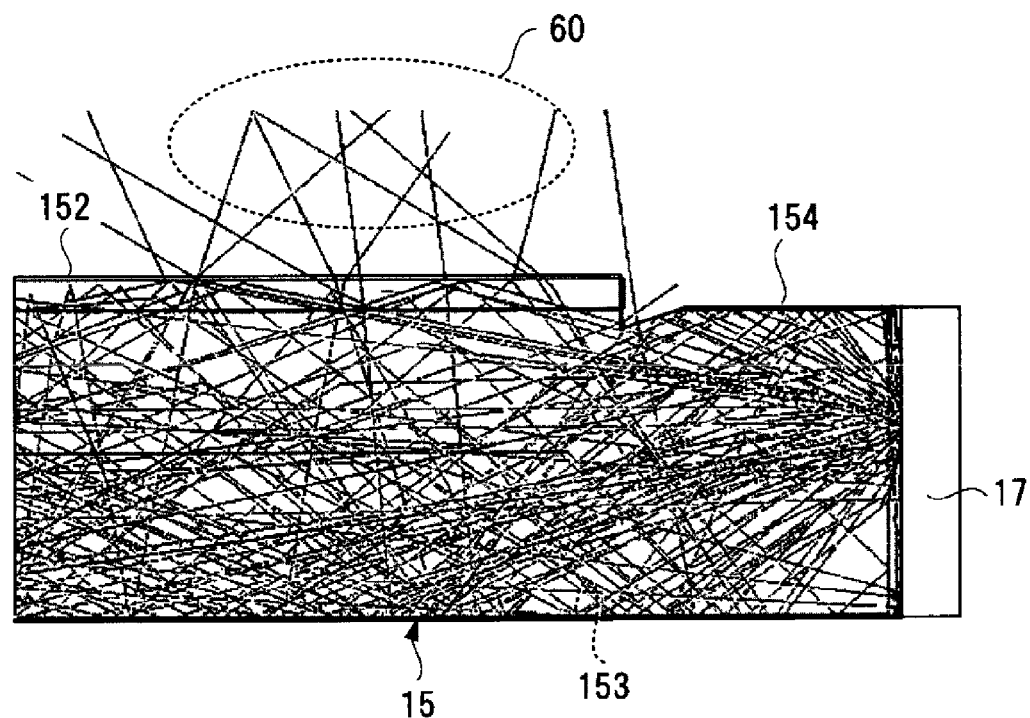
FIG. 9 is a characteristic diagram illustrating a state of reflective light in an end portion of a light-guiding body when using a light-guiding body that includes a plane stepped portion.

FIG. 9 is a characteristic diagram illustrating a state of reflective light in an end portion of the light-guiding body when using the light-guiding body 15 that includes the planar stepped portion 154 as illustrated in FIG. 5. Light from the LED 17 is reflected or scattered on the light scatter surface 153 of the light-guiding body and is emitted from the second surface 152. Rays of the light converge at a part of FIG. 9 illustrated with an ellipse 60 close to the planar stepped portion 154.

Figure 10:
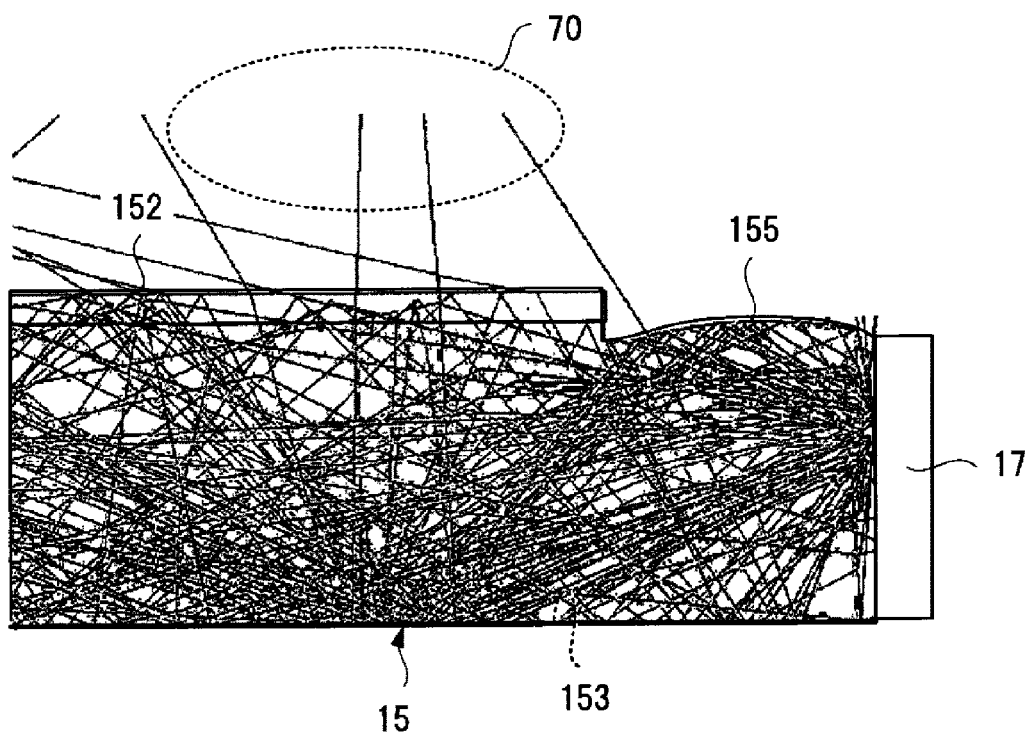
FIG. 10 is a characteristic diagram illustrating a state of reflective light in an end portion of the light-guiding body when using the light-guiding body that includes an arc-shaped stepped portion in the exemplary embodiment.

FIG. 10 is a characteristic diagram illustrating a state of reflective light in an end portion of the light-guiding body when using the light-guiding body 15 that includes the arc-shaped stepped portion 155 as illustrated in FIG. 7 (or in FIG. 8). Light from the LED 17 is reflected or scattered on the light scatter surface 153 of the light-guiding body and is emitted from the second surface 152. Rays of the light do not converge, but diverge at a part of FIG. 10 illustrated with an ellipse 70 close to the arc-shaped stepped portion 155.

A characteristic of illuminance distribution when using the light-guiding body 15 that includes the arc-shaped stepped portion 155 is illustrated with a solid line B in FIG. 6. Illuminance is increased somewhat in the vicinity of one end portion of the light-guiding body 15 in the characteristic B, but the characteristic B is gradual without any radical changes and ripples, as compared with the radically changing characteristic A, in which the ripple A1 occurs. That is, rays of light do not converge at a part but diverge. The shape of the arc-shaped stepped portion 155 of the light-guiding body 15 may be spherical besides being circular.

According to the embodiment described above, reading performance on a document may be uniform in the main-scanning direction, rather than deteriorated in the end portions in the main-scanning direction.

The image reading device (scanner unit) 10 is exemplified as being disposed inside the MFP 100 in the above description, but the image reading device may be configured as a stand-alone scanner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reading device comprising:
    a document table having a document read area;
    an illumination unit that includes a light source configured to illuminate the document read area, and a light-guiding body configured to allow light from the light source to be incident on both end portions extending in a main-scanning direction and to scatter or reflect the light to be emitted toward the document read area;
    an arc-shaped portion that is formed at both end portions of the light-guiding body;
    a carriage that supports the illumination unit to be movable in a sub-scanning direction;
    a hold-down member that holds down the both end portions of the light-guiding body towards the carriage and regulates movement of the light-guiding body in the main-scanning direction; and
    a photoelectric conversion unit configured to receive reflected light from a document in the document read area illuminated by the illumination unit, and photoelectrically convert the light to output an electric signal,
    wherein the light-guiding body of the illumination unit has a first surface configured to allow light from the light source to be emitted toward the document read area, a second surface adjacent to the first surface and configured to allow the light from the light source to be emitted in a direction different from the direction of the light emitted from the first surface, and a third surface that faces the second surface and has a light scatter surface, and
    wherein the arc-shaped portion is formed at both end portions of the second surface.

2. The device according to claim 1,
    wherein the illumination unit includes a reflective member configured to reflect the light emitted from the second surface of the light-guiding body toward a read position for the document.

3. The device according to claim 1,
    wherein the arc-shaped portion at both end portions of the second surface is formed to be lower or higher than the second surface of the light-guiding body.

4. The device according to claim 1, wherein at both end portions of the second surface:
    the arc-shaped portion is recessed below the second surface of the light-guiding body and a riser portion extends between the arc-shaped portion and the second surface; and
    the hold-down member abuts the riser portion.

5. The device according to claim 1, wherein at both end portions of the second surface:
    the arc-shaped portion protrudes above the second surface of the light-guiding body and a riser portion extends between the arc-shaped portion and the second surface; and
    the hold-down member includes a folded portion, the hold-down member abutting the arc-shaped portion and the folded portion abutting the riser portion.

6. The device according to claim 1,
    wherein the light source is an LED, and
    wherein a support member that supports the LED at both ends of the light-guiding body is attached to the carriage.

7. An image reading device comprising:
    an illumination unit that includes a light source, and a light-guiding body configured to allow light from the light source to be incident on both end portions extending in a main-scanning direction and configured to scatter or reflect the light;
    an arc-shaped portion that is formed at both end portions of the light-guiding body;
    a carriage that supports the illumination unit to be movable in a sub-scanning direction; and
    a hold-down member that holds down the both end portions of the light-guiding body towards the carriage and regulates movement of the light-guiding body in the main-scanning direction,
    wherein the light-guiding body of the illumination unit has a first surface configured to allow light from the light source to be emitted in a first direction, a second surface adjacent to the first surface and configured to allow the light from the light source to be emitted in a second direction different from the first direction, and a third surface that faces the second surface and has a light scatter surface, and
    wherein the arc-shaped portion is formed at both end portions of the second surface.

8. The device according to claim 7,
    wherein the illumination unit includes a reflective member configured to reflect the light emitted from the second surface of the light-guiding body.

9. The device according to claim 7,
wherein the arc-shaped portion at both end portions of the second surface is formed to be lower or higher than the second surface of the light-guiding body.

10. The device according to claim 7, wherein at both end portions of the second surface:
the arc-shaped portion is recessed below the second surface of the light-guiding body and a riser portion extends between the arc-shaped portion and the second surface; and
the hold-down member abuts the riser portion.

11. The device according to claim 7, wherein at both end portions of the second surface:
the arc-shaped portion protrudes above the second surface of the light-guiding body and a riser portion extends between the arc-shaped portion and the second surface; and
the hold-down member includes a folded portion, the hold-down member abutting the arc-shaped portion and the folded portion abutting the riser portion.

12. The device according to claim 7,
wherein the light source is an LED, and
wherein a support member that supports the LED at both ends of the light-guiding body is attached to the carriage.

13. An illumination unit for an image reading device, comprising:
a light source configured to illuminate a document read area of the image reading device; and
a light-guiding body configured to allow light from the light source to be incident on both end portions extending in a main-scanning direction of the image reading device and configured to scatter or reflect the light to be emitted toward the document read area; and
an arc-shaped portion that is formed at both end portions of the light-guiding body,
wherein the light-guiding body has a first surface configured to allow light from the light source to be emitted toward the document read area, a second surface adjacent to the first surface and configured to allow the light from the light source to be emitted in a direction different from the direction of the light emitted from the first surface, and a third surface that faces the second surface and has a light scatter surface, and
wherein the arc-shaped portion is formed at both end portions of the second surface.

14. The illumination unit according to claim 13, further including a reflective member configured to reflect the light emitted from the second surface of the light-guiding body toward a read position of the image reading device.

15. The illumination unit according to claim 13,
wherein the arc-shaped portion at both end portions of the second surface is formed to be lower or higher than the second surface of the light-guiding body.

16. The illumination unit according to claim 13, wherein at both end portions of the second surface:
the arc-shaped portion is recessed below the second surface of the light-guiding body and a riser portion extends between the arc-shaped portion and the second surface.

17. The illumination unit according to claim 13, wherein at both end portions of the second surface:
the arc-shaped portion protrudes above the second surface of the light-guiding body and a riser portion extends between the arc-shaped portion and the second surface.

* * * * *